(12) United States Patent
Andre et al.

(10) Patent No.: US 8,978,852 B2
(45) Date of Patent: Mar. 17, 2015

(54) UPPER LATERAL STRUCTURE FOR THE OCCASIONAL OR CONTINUOUS COLLECTION OF MAIN-DRIVE OR AUXILIARY ELECTRICAL POWER BY A LAND VEHICLE

(75) Inventors: Jean-Luc Andre, Molsheim (FR); Didier Mandart, Hendava (FR); Christophe Binder, Keskastel (FR)

(73) Assignee: Lohr Industrie, Hangenbieten (FR)

( * ) Notice: Subject to any disclaimer, the term of this patent is extended or adjusted under 35 U.S.C. 154(b) by 312 days.

(21) Appl. No.: 13/637,702

(22) PCT Filed: Mar. 29, 2011

(86) PCT No.: PCT/IB2011/051315
§ 371 (c)(1),
(2), (4) Date: Nov. 29, 2012

(87) PCT Pub. No.: WO2011/121528
PCT Pub. Date: Oct. 6, 2011

(65) Prior Publication Data
US 2013/0092492 A1    Apr. 18, 2013

(30) Foreign Application Priority Data

Mar. 29, 2010    (FR) .................................... 10 01268

(51) Int. Cl.
*B60L 5/08*    (2006.01)
*B60L 5/42*    (2006.01)
*B60M 1/36*    (2006.01)
(52) U.S. Cl.
CPC .. *B60L 5/42* (2013.01); *B60M 1/36* (2013.01);
*B60L 2200/26* (2013.01)
USPC ............................................. 191/47; 191/10

(58) Field of Classification Search
USPC ................................................... 191/47–60.2
See application file for complete search history.

(56) References Cited

U.S. PATENT DOCUMENTS 801,226 A * 10/1905 Davis et al. ..................... 191/56
1,125,518 A * 1/1915 Hampshire ..................... 191/65
(Continued)

FOREIGN PATENT DOCUMENTS

DE    136 240    11/1902
DE    525 318 C    5/1931
(Continued)

OTHER PUBLICATIONS

See French Search Corresponding to FR 10 01268.
(Continued)

*Primary Examiner* — Jason C Smith
(74) *Attorney, Agent, or Firm* — Davis & Bujold, PLLC; Michael J. Bujold

(57) ABSTRACT

The upper lateral collection structure (8) is mounted on a land vehicle (1), notably an urban public transport vehicle, and cooperates, for the purpose of overhead electrical power supply to the vehicle, with fixed contact slippers (16) located along its route. This structure comprises: a conducting track (14) arranged longitudinally (NEW) the upper lateral part of the vehicle and comprising a contact region (15) for the contact slipper; an electrical connection connecting the conducting track to the electrical circuit of the vehicle; an insulating support (24) on which the conducting track is mounted; a means of mechanical connection of the collecting structure to the vehicle; and a damping device which damps out the shocks resulting from the contact slipper and ensures satisfactory contact between the conducting track and the contact slipper. This invention is of benefit to the manufacturers of electrically powered public transport vehicles.

20 Claims, 8 Drawing Sheets

(56) References Cited

U.S. PATENT DOCUMENTS

| | | | | |
|---|---|---|---|---|
| RE29,994 E | * | 5/1979 | Bossi | 191/2 |
| 5,669,470 A | * | 9/1997 | Ross | 191/10 |
| 8,232,671 B2 | * | 7/2012 | Andre et al. | 307/9.1 |
| 8,324,858 B2 | * | 12/2012 | Hill et al. | 320/109 |
| 8,820,500 B2 | * | 9/2014 | Andre | 191/47 |
| 8,829,853 B2 | * | 9/2014 | Hill et al. | 320/109 |
| 2012/0260818 A1 | * | 10/2012 | Song | 105/238.1 |
| 2013/0092492 A1 | * | 4/2013 | Andre et al. | 191/47 |

FOREIGN PATENT DOCUMENTS

| | | |
|---|---|---|
| FR | 2 910 391 A1 | 6/2008 |
| GB | 8267 | 0/1913 |
| GB | 320 253 A | 10/1929 |

OTHER PUBLICATIONS

See International Search Corresponding to PCT/IB2011/051315.

* cited by examiner

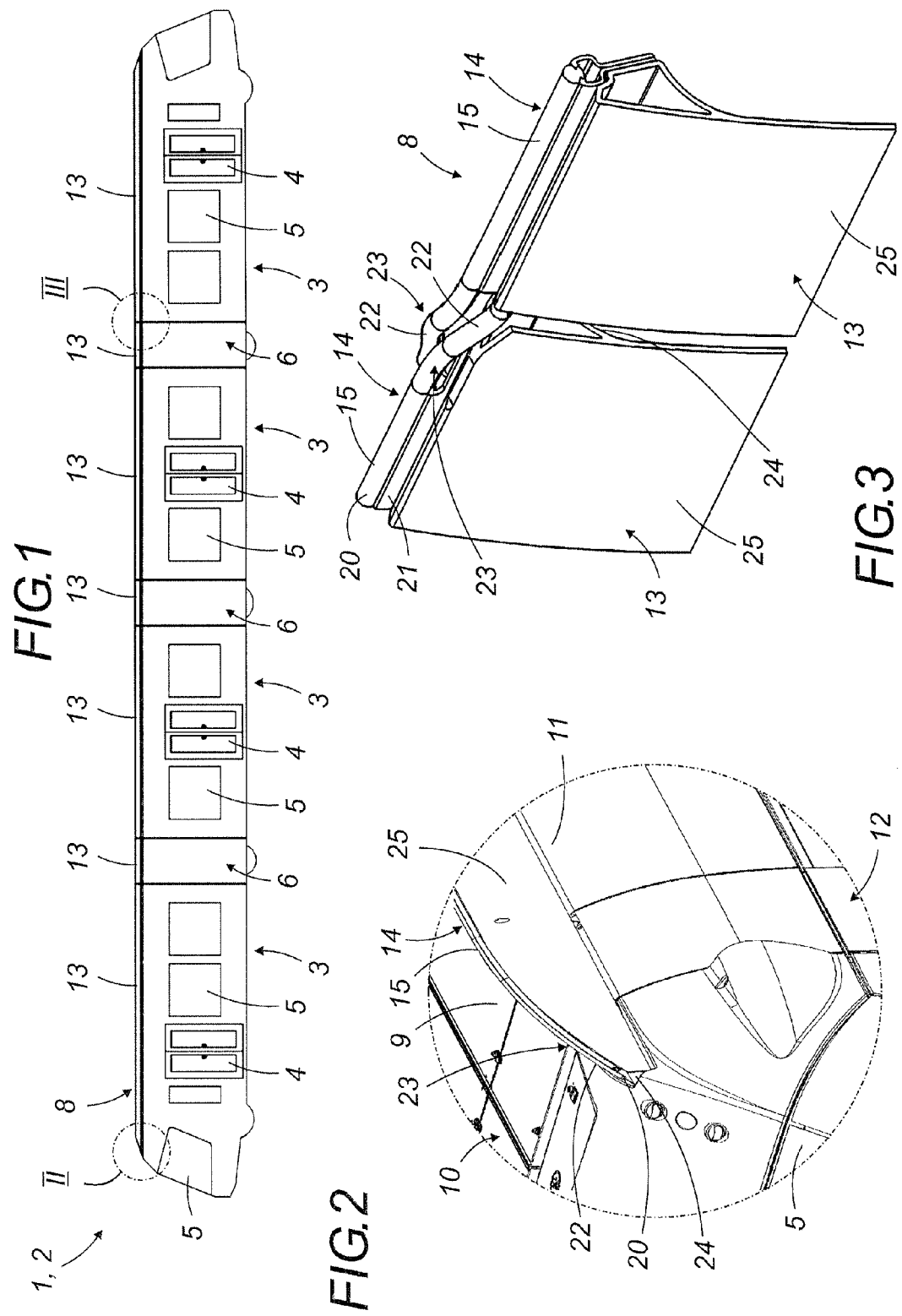

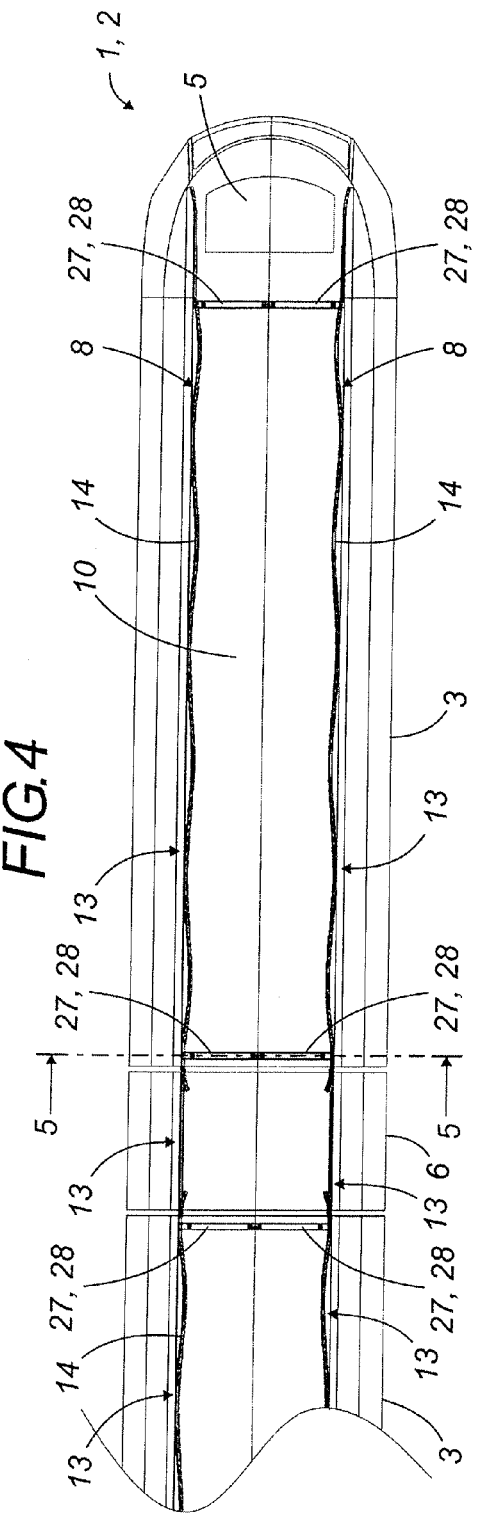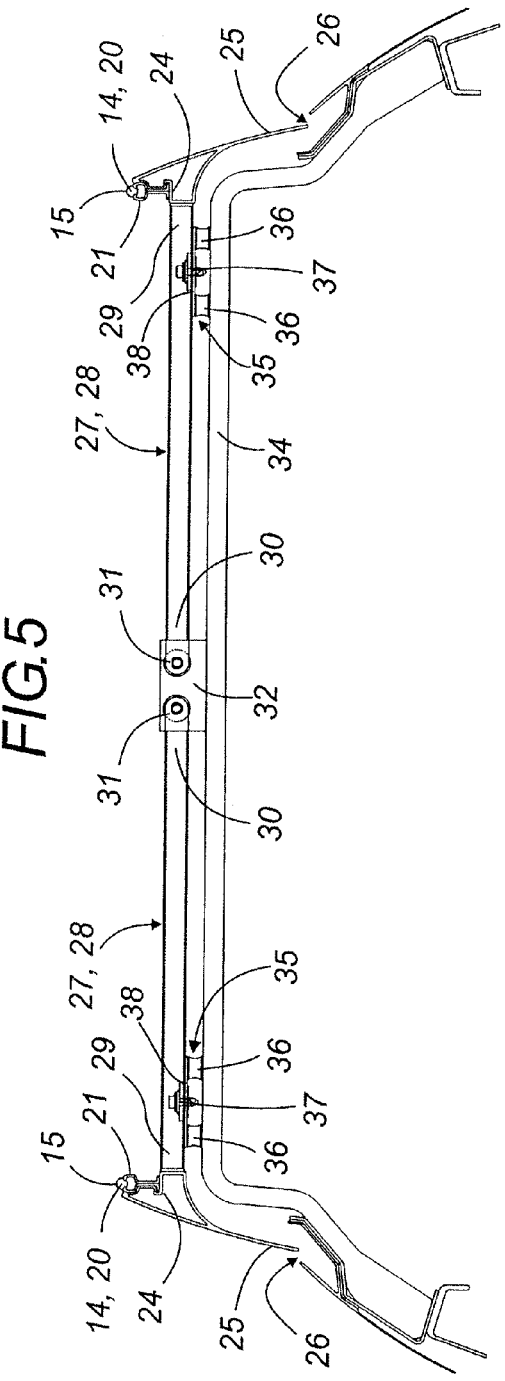

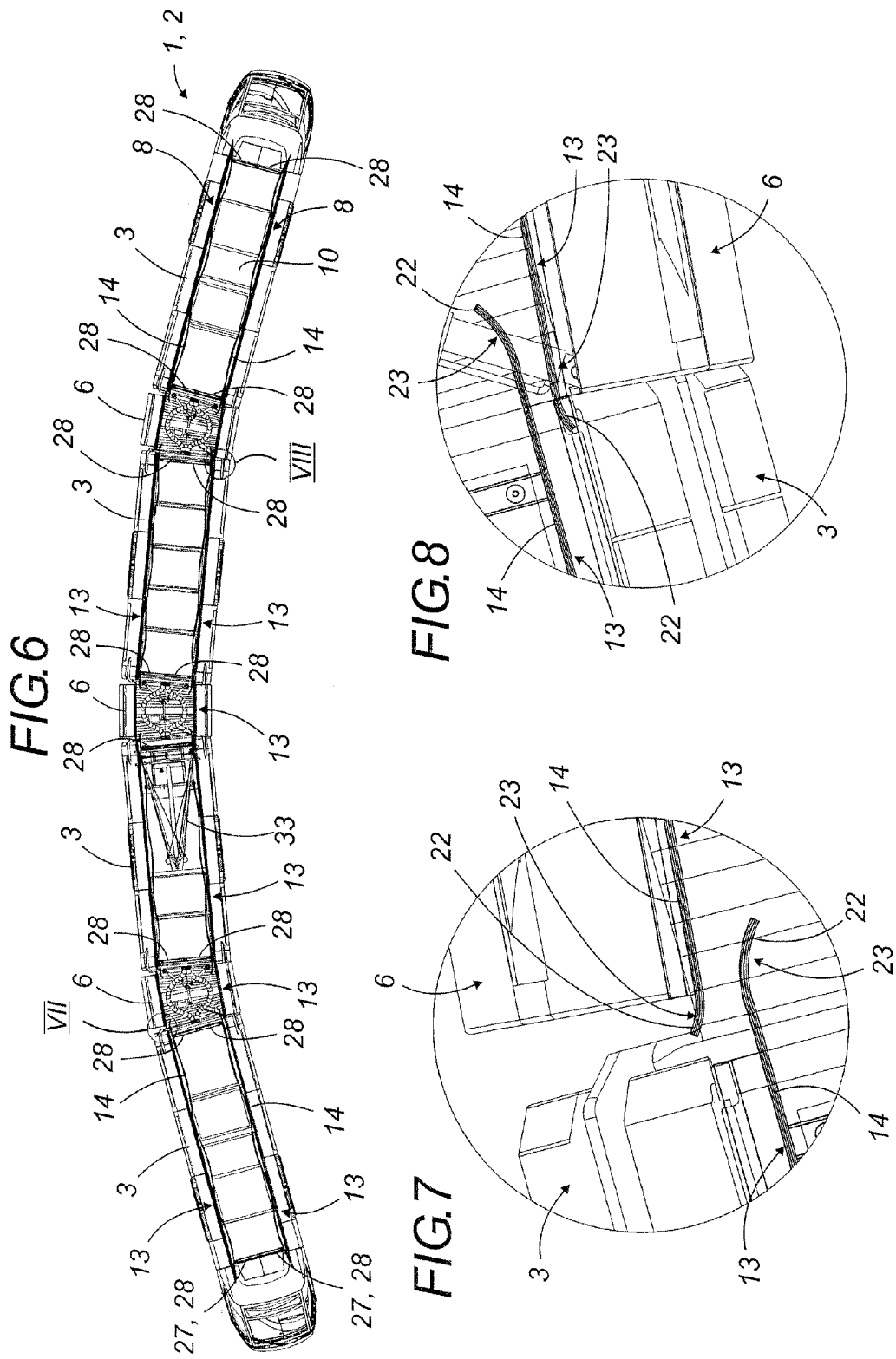

# UPPER LATERAL STRUCTURE FOR THE OCCASIONAL OR CONTINUOUS COLLECTION OF MAIN-DRIVE OR AUXILIARY ELECTRICAL POWER BY A LAND VEHICLE This application is a National Stage completion of PCT/IB2011/051315 filed Mar. 29, 2011, which claims priority from French patent application serial no. 10 01268 filed Mar. 29, 2010.

FIELD OF THE INVENTION

The present invention concerns an upper structure attached to a land transportation vehicle, for example, a public urban transportation vehicle, for collecting main drive and auxiliary electrical energy.

In particular, it relates to an upper lateral collection structure, that is, one located in the upper lateral portion of the vehicle that may be attached to either the vehicle's lateral roof edge or the upper edge of the vehicle's lateral side wall.

This storage structure cooperates with fixed aerial electrical energy distribution equipment placed along the vehicle's travel route, specifically in the form of supply shoes supported by electrical energy distribution arms, each attached to a post or any other type of fixed support.

The present invention generally concerns aerial supply of electrical energy, and not ground supply, to a vehicle.

BACKGROUND OF THE INVENTION

In the field of public passenger transportation, the present tendency is to manufacture vehicles with lowered floors to facilitate entering and exiting of passengers, strollers and wheelchairs either inside or outside the vehicle. These vehicles are also responsive to the increasingly numerous regulations imposed to improve accessibility for handicapped people or those with reduced mobility.

Because the vehicles have been lowered, much of the operational and technical equipment such as, for example, hydraulic, electrical, ventilation, air conditioning, regulatory, energy supply equipment and the like, formerly housed in the lower portion of the vehicle, must be displaced and has been transposed to the vehicle roof, where it is generally housed in roof containers.

The vehicle roof, therefore, becomes very encumbered and if aerial supply of electricity to the vehicle is desired, very little space remains available for installing aerial electrical collection structures, such as pantographs and the like.

SUMMARY OF THE INVENTION

The goal of the invention is to provide a novel upper electrical energy collection structure attached not to the central portion of the vehicle roof, but rather to the upper lateral portion of the vehicle, that is, on the lateral edge of the vehicle roof or the upper edge of the lateral side wall of the vehicle.

The central portion of the roof is therefore left completely free for roof containers and the technical equipment they hold.

In addition, maintenance of these storage structures is greatly facilitated because being more accessible, they can be reached directly using lateral bridges installed on the side of the vehicle.

To resolve this technical problem, the invention provides an upper motive or auxiliary electrical energy collection structure for attachment to a land vehicle, particularly a public urban transportation vehicle, articulated or non-articulated, and formed of one or more modules. This upper collection structure cooperates to supply motive or auxiliary electricity to the vehicle using fixed supports comprising an electrical energy distribution shoe and which are located along the vehicle's travel route.

According to the invention, this upper collection structure comprises one or more collection elements, each comprising the following means:
 at least one conductive track disassociated from the vehicle that extends generally longitudinally relative to the vehicle on its upper lateral portion and which comprises a sliding or motionless contact area for the electrical energy distribution shoe.
 a flexible electrical connector joining the conductive track to the vehicle's electrical supply circuit;
 an electrically insulating support to which the conductive track is attached;
 a mechanical means connecting the collection element to the vehicle; and
 a suspension and damping device to deaden shocks coming from the electrical energy distribution shoe and ensure satisfactory contact between the conductive track and the electrical energy distribution shoe.

According to a preferred embodiment, in at least one of the collection elements the conductive track advantageously has, on at least one extremity, a sloping portion forming an inclined ramp engaging the electrical energy distribution shoe.

The one or more upper lateral collection structures, of the invention, may coexist with different types of conventional collection structures on the same vehicle, notably a pantograph, thereby forming a mixed collection system supplying the vehicle either simultaneously or alternately.

Therefore, if a city is already equipped with conventional catenary sections, for example, the vehicle may advantageously be supplied using a pantograph for these sections, and using the upper lateral collection structures of the invention on new tracks equipped with fixed equipment adapted for distribution of electrical energy. Therefore, it is not necessary to redo the old portions of the network; only the new portions before grading.

Additionally, the fixed electrical distribution equipment that cooperates with the upper lateral collection structures of the invention is also advantageous. Since the collection structure of the invention is actually in the upper lateral position and not the central position, the fixed arms supporting the electrical distribution shoes can be shorter, that is, they can overlap less. Since they protrude less over the track, they leave the central track space free for use by taller passing vehicles, such as emergency or service vehicles: fire, police, maintenance, first aid and various assistance vehicles.

According to a particular embodiment of the invention, the vehicle may comprise two upper lateral collection structures, according to the invention, each extending along a side of the vehicle. One of these structures can be used to bring electrical current to the vehicle, while the second one is used for returning current. Therefore, it is possible to supply electrical energy to vehicles which have no other means of current return, such as coaches or buses on wheels with tires, for example.

Obviously, current return can be accomplished in any other way conceived by a person skilled in the art, for example, using a guide rail on the ground for vehicles guided in this way.

BRIEF DESCRIPTION OF THE DRAWINGS

Other characteristics and features of the invention will be apparent from reading the following detailed description, taken with reference to the attached drawings, in which:

FIG. 1 is a profile view of a tramway type of public urban transportation vehicle formed of several successive modules articulated one after the other and equipped with two upper lateral collection structures according to the invention;

FIG. 2 is an enlarged perspective of the detail circled and referenced as II in FIG. 1, showing with more particularity the front end of a first embodiment of the collection structure according to the invention;

FIG. 3 is an enlarged perspective of the detail circled and referenced as III in FIG. 1, showing with more particularity the first embodiment of the collection structure of the invention;

FIG. 4 is an overhead view of a portion of the vehicle of FIG. 1 on a straight travel portion;

FIG. 5 is a transverse cross-section, taken along plane 5-5 of FIG. 4, of the upper portion of the vehicle of FIG. 1 showing with more particularity a first embodiment of the upper lateral structure of the invention;

FIG. 6 is an overhead view of a tramway type of public urban transport vehicle equipped with two upper lateral collection structures according to the first embodiment of the invention and with a pantograph, with the vehicle located on a curved portion of its route;

FIGS. 7 and 8 are enlargements of the details circled and referenced as VII and VIII in FIG. 6, which represent the collection structure of the invention at the area where a module and an intermediate articulation unit of the vehicle are joined, located on the exterior and the interior side of the curve, respectively;

DETAILED DESCRIPTION OF THE PREFERRED EMBODIMENTS

Figure 9:
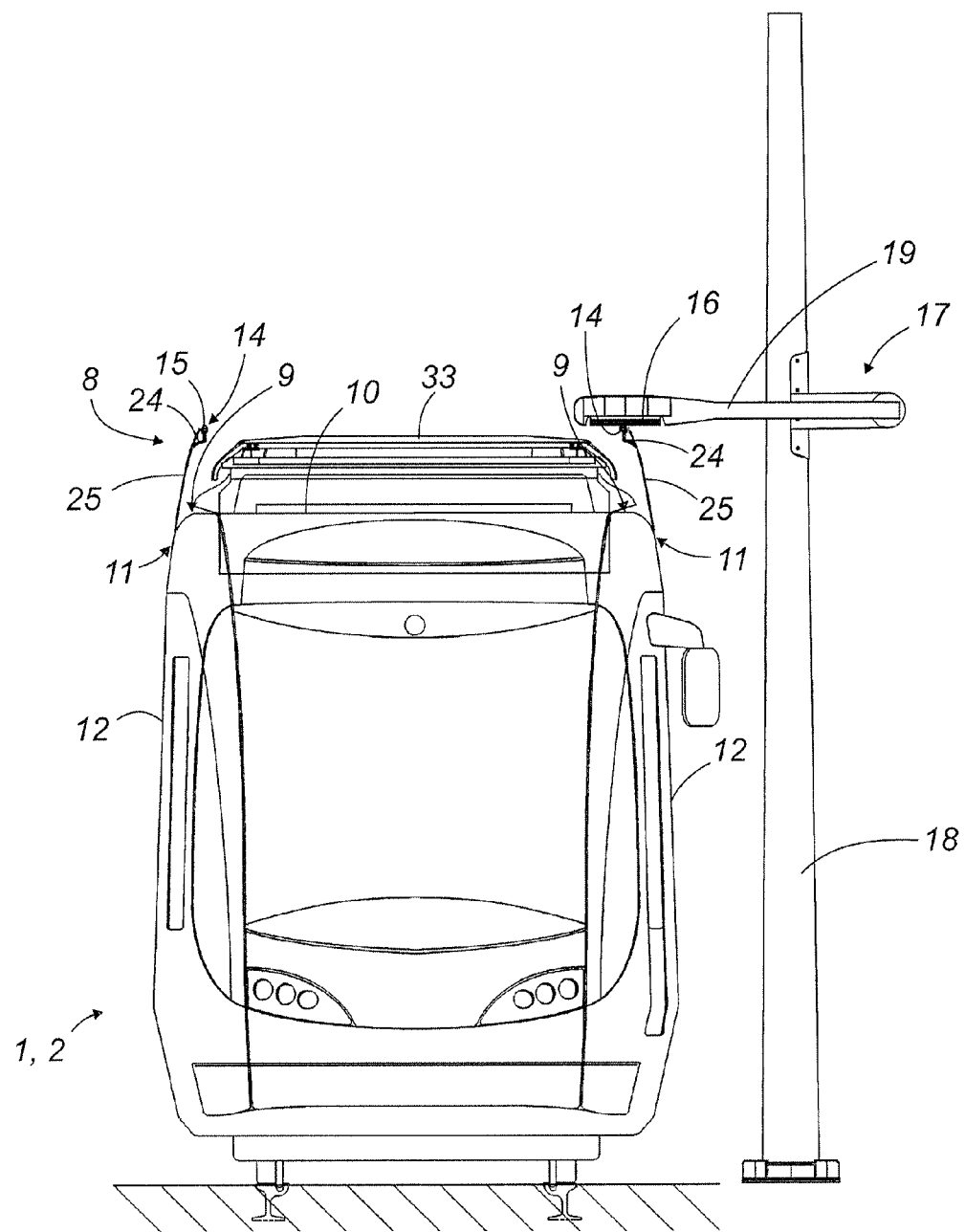
FIG. 9 is a front view of a tramway type of public urban transport vehicle equipped with two upper lateral collection structures, according to the invention, and with a pantograph, with the vehicle located in electrical energy collection position using one of the upper lateral collection structures which is in sliding contact with an electrical energy distribution shoe on a fixed support placed along the vehicle's travel route.

The upper lateral collection structure, according to the present invention, will now be described in detail with reference to FIGS. 1 through 14. Equivalent elements shown in different drawings will bear the same reference numerals.

The upper electrical energy collection structure, according to the invention, is preferably designed for a public urban transportation vehicle 1.

It may be a tramway type vehicle, for example, as shown in FIGS. 1, 4, 6 and 9, that is, a vehicle forming a series consisting of a succession of several modules 3 each comprising an access door 4 and windows 5. The modules 3 are articulated, one after the other, by means of intermediary articulating units 6 each supported by a guided or non-guided axle.

It may also be a tramway type vehicle comprising only a single module or two successive modules that may or may not communicate with each other, or even several coupled vehicles.

Figure 10:
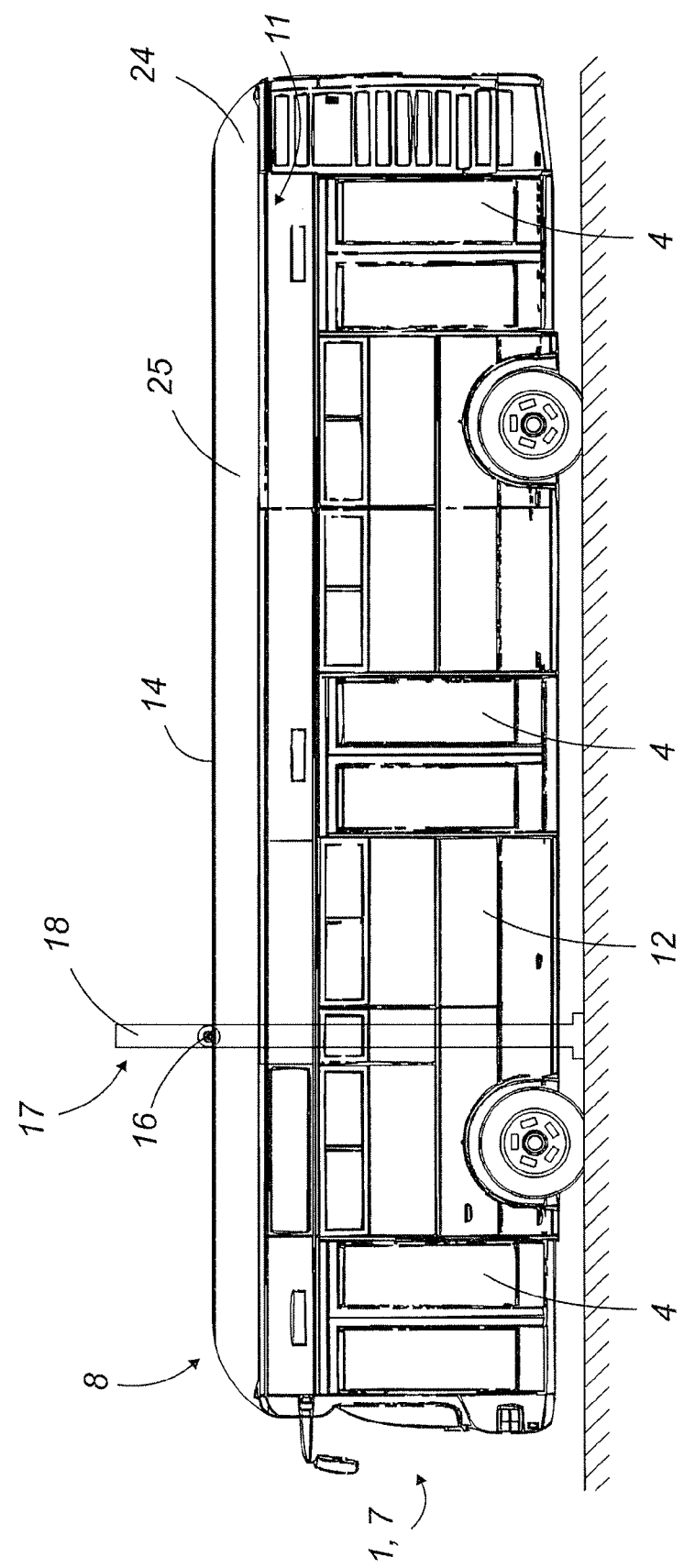
FIG. 10 is a profile view of a bus type of public urban transport vehicle equipped with upper lateral collection structures, according to the invention.
Figure 11:
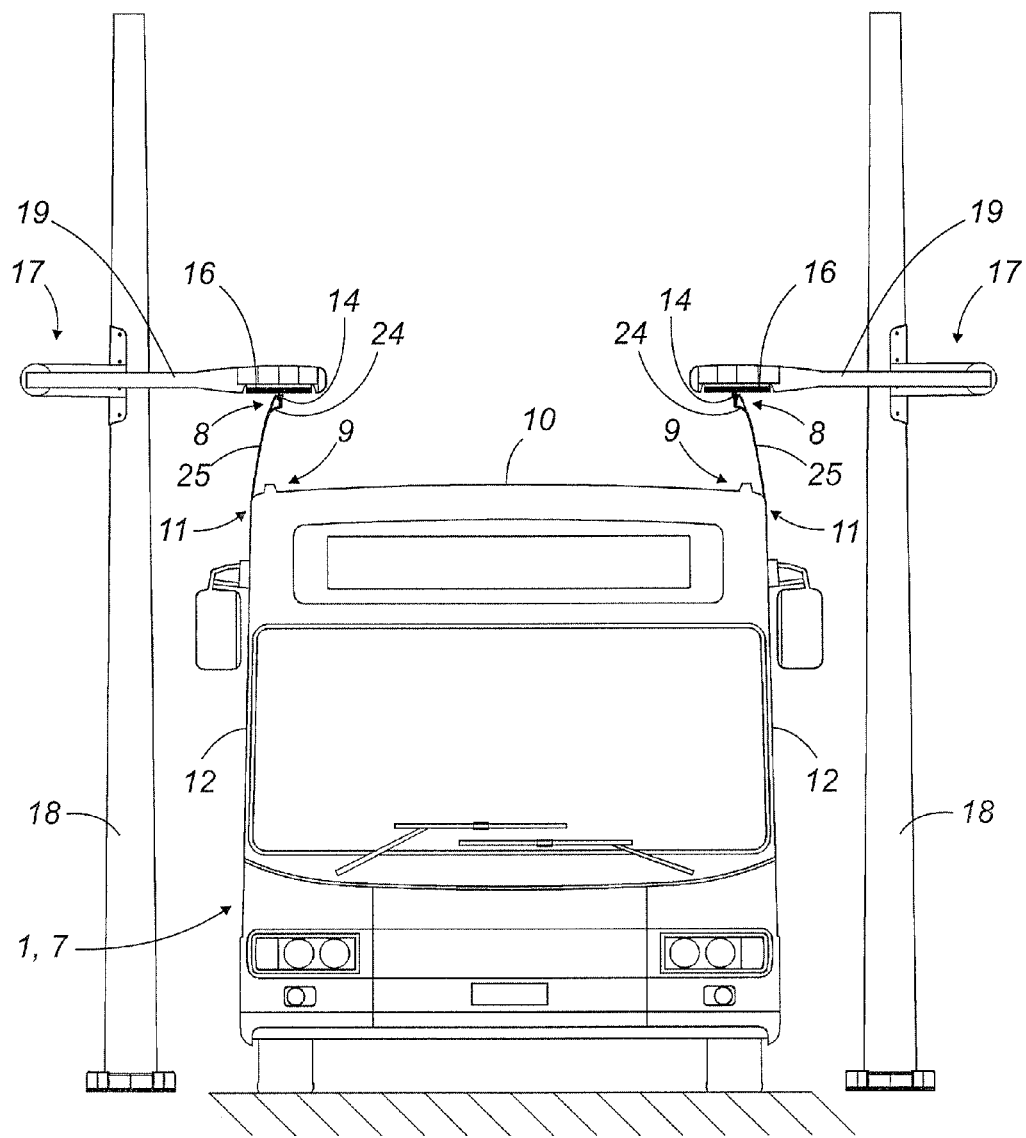
FIG. 11 is a front view of the vehicle of FIG. 10 in electrical energy collection position.

It may also be a bus type vehicle 7 as shown in FIGS. 10 and 11 comprising only a single module 3 or two successive articulated modules.

The vehicle 1 comprises at least one upper lateral electrical energy collection structure 8, according to the invention, extending on the upper lateral portion of the vehicle, that is, at a lateral edge 9 of vehicle roof 10 or at the upper edge 11 of one of the lateral side walls 12 of the vehicle.

For safety reasons and in order to prevent any accidental or malicious contact, collection structure 8 of the invention must be placed high enough to remain inaccessible not only to passengers, pedestrians or anyone who might be in proximity of vehicle 1, but also beyond the reach of umbrellas, canes, packages, and any object that is large or held aloft. For this reason, it is always located above vehicle doors 4 and preferably at a height of three or more meters above the ground.

Depending upon the embodiment, vehicle 1 may be equipped with a single upper lateral collection structure 8 according to the invention on one of its sides, or two upper lateral collection structures 8, according to the invention, each extending along one of its sides.

If vehicle 1 comprises two upper lateral collection structures 8, they may be used alternately, for example, depending upon the placement of fixed electrical energy distribution sources implanted along the different portions of the route or depending upon the vehicle's direction of travel. When the vehicle is in a station, it may be designed to use only the collection structure located on the side opposite the platform, for example, in order to further safeguard the passengers.

These collection structures may also be used simultaneously, for example to furnish a stronger supply of electricity during startup, during the entire length of the route, in certain specific locations along its route, or for dual polarity electrical supply with the second collection structure ensuring current return when the vehicle has no other means to accomplish this.

Depending upon the vehicles on which it is implanted, lateral collection structure 8, according to the invention, may comprise one or more successive collection structures 13. When vehicle 1 is formed of several modules 3, upper lateral collection structure 8 preferably comprises several collection structures 13 distributed on the various vehicle modules 3 and preferably one collection element 13 per module 3 of the vehicle 1.

Upper lateral collection structure 8 comprises a flexible electrical connection that electrically connects its one or more conductive tracks to the electrical supply circuit for vehicle 1. This electrical connection is preferably formed of one or more flexible supply conductors, for example, located on the extremities of collection structure 8 or preferably for increased reliability, at each collection element 13 to ensure a continuous supply of electricity to the vehicle, even if the continuity of electrical supply to upper lateral collection structure 8 is interrupted.

To improve safety and decrease the risk of accidental electrocution during contact with a conductive track, the electrical connection of collection structure 8 preferably comprises one or more diodes. The conductive track of each collection structure 8 or preferably of each collection element 13 is thus connected to the vehicle's electrical supply circuit via one or more safety diodes.

These diodes allow passage from the conductive track to the vehicle's electrical circuit and they are blocked in the opposite direction. Therefore, they only allow current to pass from the conductive track toward the vehicle's electrical circuit and they block any current from returning toward the conductive track. Thus, they guarantee that the conductive tracks, not supplied directly by an electrical energy distribution shoe, are not electrified and remain so even if, during this time, the electrical circuit of vehicle 1 is supplied by some other means such as a pantograph, for example, or a supplemental reserve supply of electrical energy.

This arrangement greatly improves not only the safety of passengers and others who might be in the vicinity of the vehicle, but also of maintenance operators and other technical personnel frequently required to work on the vehicle roof.

The collection structure 8 of the invention may be interrupted in the area of the vehicle's articulations, as shown in the example of FIGS. 2 and 3, to allow rolling, pitching and twisting motions associated with travel and topology of the travel surface, as well as the relative moving together and separating of successive modules associated with vehicle acceleration, deceleration or braking and, in general, to vehicle dynamics.

According to another possible embodiment, collection elements 13 may be connected to one another near the vehicle's articulations by a conductive connector, for example, by an articulated sliding connector or one that is sufficiently flexible, elastic or deformable to adapt to various relative movements by the successive modules of vehicle 1 articulated to one another.

It is also possible for intermediate articulation units 6 of vehicle 1 to be equipped with a different type of collection elements or even to have none, especially if the vehicle is equipped with its own electrical energy supply (batteries, inertia flywheels).

According to the invention, upper lateral collection structure 8, or each of its collection elements 13, comprises a conductive track 14 extending generally longitudinally relative to the vehicle and comprising a portion capable of serving as a sliding or motionless contact area 15 with a block or electrical energy distribution shoe 16 held by a fixed support 17 located along the travel route of vehicle 1.

There are numerous types of fixed supports 17 that may be used with upper lateral collection structure 8 of the invention. For example, they may be poles such as poles 18, posts, signal panels, the lower or lateral surface of a bridge, tunnel, building façade, travel shelter or any other piece of fixed equipment located near the route traveled by the vehicle. Each of these fixed supports 17 holds one or more electrical energy distribution shoes 16, using, for example, an arm 19 projecting perpendicularly to the travel path of vehicle 1. Each distribution shoe 16 comes into contact with contact zone 15 on collection structure 8 when vehicle 1 is located near the fixed support 17 and thus ensures that electrical energy is supplied to vehicle 1. This contact may be motionless or sliding depending upon whether the vehicle is stopped near fixed support 17 or is being displaced and passes close to it.

To supply vehicle 1 during travel, a multitude of fixed supports 17 must be provided all along the vehicle's travel route or in localized areas on the route. The spacing between these supports depends upon the motive or auxiliary electrical energy supply requirements. For example, the spacing may be chosen so that there is always a distribution shoe 16 in contact with collection structure 8 regardless of the position of vehicle 1 along its travel route. Naturally, these fixed supports 17 may be spaced much farther apart and their placement may be limited to certain localized places along the course, for example, if the vehicle comprises a means of storing electrical energy.

The conductive track 14 on upper lateral collection structure 8 is preferably a linear track extending generally longitudinally relative to the vehicle. It may be formed of a bar, for example, a rod, a metal wire 20 or any other metal element with a large enough section, particularly a wire made of copper and silver alloy. Under certain conditions of use this metal wire 20 may advantageously be mounted on a conductive portion 21, made of aluminum, for example, in order to increase its section and thereby its capacity to accept a higher current density without overheating.

Conductive track 14 may be rectilinear or preferably curved or undulating, for example, following a serpentine path that alternates toward the inside and then the outside of the vehicle as in the preferential examples shown in FIGS. 4 and 6, or a zigzag, winding, or any other non-linear configuration conceivable by a person skilled in the art, generally proceeding in an essentially longitudinal direction relative to the vehicle.

Using such an undulating configuration for conductive track 14 prevents the formation of a groove from wear on electrical energy distribution shoes 16 on fixed supports 17. Wear and tear on distribution shoes 15 is advantageously distributed over a larger surface, thereby reducing the frequency of replacement.

Conductive track 14 has a contact zone 15, for example, a generally flat, smooth surface designed to cooperate with electrical energy distribution shoe 16. According to variations of the invention, this contact zone 15 may be oriented toward the top of the vehicle, as in FIGS. 1 through 11, or toward the exterior side of the vehicle, as in FIGS. 12 through 14. The block or electrical energy distribution shoe 16 as well as its fixed support 17 are consequently adapted to ensure satisfactory contact with contact zone 15 on conductive track 14, regardless of its orientation.

Preferably, conductive track 14 has, at least at one end, a sloping portion 22 forming an inclined ramp engaging electrical energy distribution shoe 16, as seen in FIG. 2, for example. This inclined engaging ramp serves as a contact surface for distribution shoe 16 to form the smoothest possible initial mechanical and electrical contact, progressively, gently moving distribution shoe 16 onto contact zone 15 of conductive track 14.

Naturally, the direction of the angle of this sloping portion 22 depends upon the general orientation of conductive track 14. Therefore, when contact zone 15 of conductive track 14 is directed upward, that is, when it faces upward, this sloping portion 22 points down, that is, it is angled toward the bottom, as seen in FIGS. 2 and 3, for example.

Figure 12:
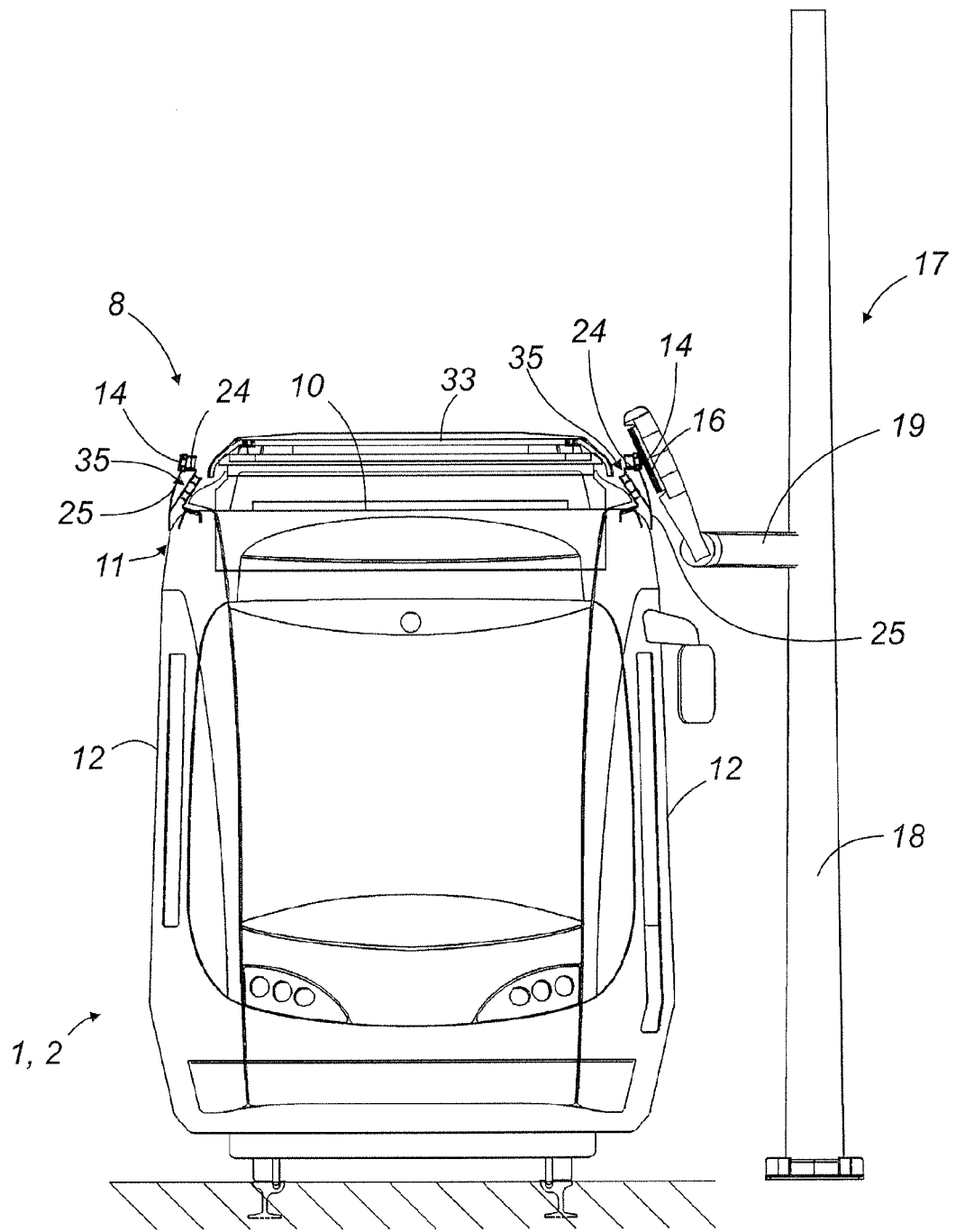
FIG. 12 is a view of a tramway type of public urban transport vehicle equipped with two upper lateral collection structures, according to a second embodiment of the invention.
Figure 13:
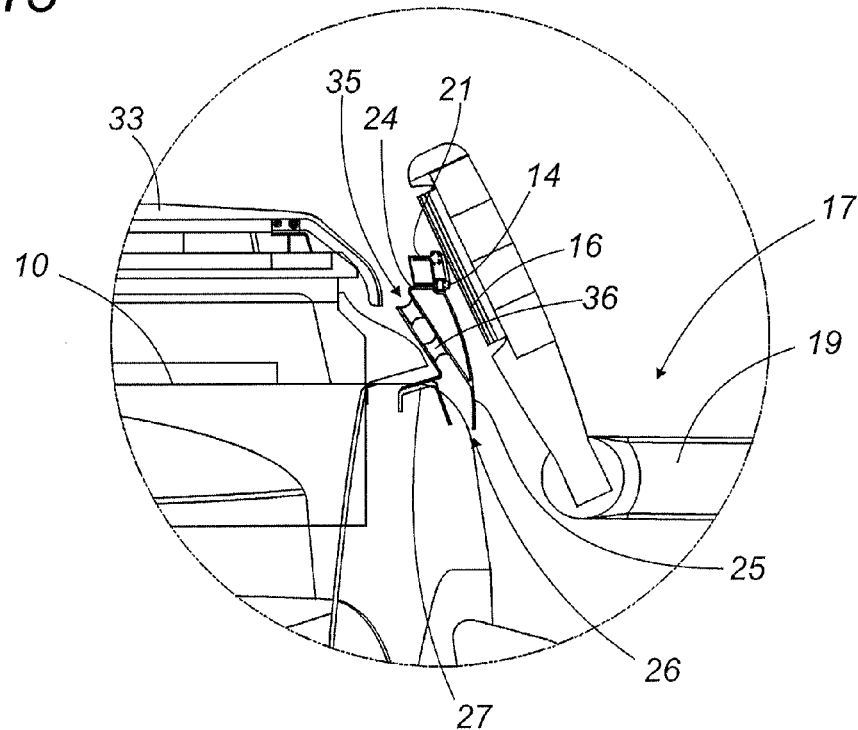
FIG. 13 is an enlargement of a detail in FIG. 12 showing with more particularity one of the upper lateral collection structures in supply contact with a fixed supply shoe.
Figure 14:
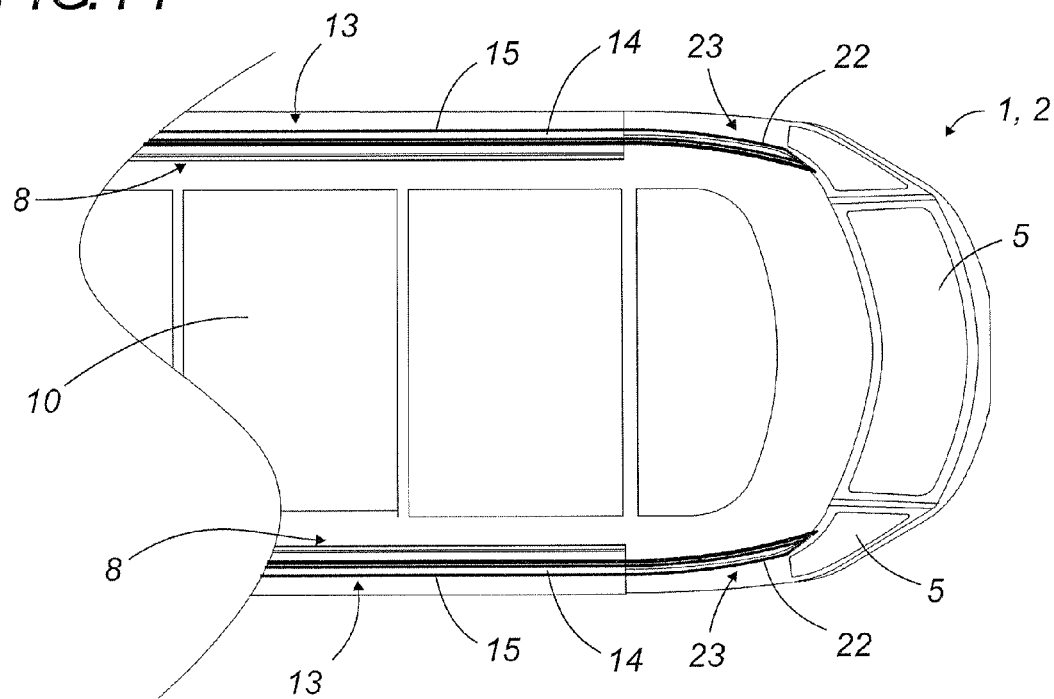
FIG. 14 is an overhead view of a portion of the vehicle of FIG. 12.

Conversely, when contact zone 15 on conductive track 14 is directed toward the exterior side of the vehicle as in the variation show in FIGS. 12 through 14, sloping portion 22 is angled toward the inside of the vehicle as shown in FIG. 14. In this way it forms an attack ramp facilitating contact with an electrical energy distribution shoe 16 disposed essentially vertically. In this case sloping portion 22 can advantageously follow the curve of the extremity of vehicle 1. At the vehicle extremities, the shape of the chassis actually curves progressively towards its central portion.

Preferably there is a sloping portion 22 forming an angled ramp at the front and rear of upper lateral collection structure 8 of the invention, and even more preferably, at the front and rear of each collection element 13 on this collection structure

8 to permit the electrical energy distribution shoe 16 to pass smoothly from one collection element 13 to the other, and thus from one vehicle module 3 to the next module 3 while vehicle 1 is moving forward. To establish contact smoothly, conductive track 14 on collection structure 8 may advantageously begin and end, if the vehicle is bidirectional, with a sloping portion 22 serving as a ramp. The ramp is oriented so as to correctly displace electrical energy distribution shoe 16 to allow it to function properly. Preferably, such a ramp also exists at each terminal portion of collection element 13 in order to prevent distribution shoe 16 from jumping or jamming during vehicle displacement.

In a simpler variation concerning a unidirectional vehicle, for example, such a sloping portion 22 serving as a ramp may be necessary only at the front of conductive track 14, on the side making contact with the distribution shoe.

Advantageously, and as shown in FIGS. 3 and 6 through 8, conductive tracks 14 of two successive collection elements 13 may extend side by side at their adjacent end portions 23 in order to ensure electrical continuity when electrical energy distribution shoe 16 passes from one collection element to the other due to the forward motion of vehicle 1. This transition may be further facilitated by the presence of a sloping portion 22 forming an inclined ramp at the end of each of these adjacent end portions 23.

Such a side-by-side disposition of end portions 23 of conductive tracks 14 of two successive collection elements 13 allows conductive track 14 to be locally doubled in this area. With a large enough electrical energy distribution shoe 16, electrical continuity can be guaranteed even if collection elements 13 remain independent and mechanically discontinuous and conductive tracks 14 are not in contact with one another. It is, therefore, possible to maintain a continuous electricity supply from collection elements 13 that are discontinuous and capable of being displaced relative to one another, which is the case at the articulations between different vehicle modules during travel.

FIGS. 6 through 8 show with more particularity this general technical functioning for a preferred embodiment of the invention. When vehicle 1 is located on a curved portion of its trajectory, modules 3 and the intermediate articulation modules 6 composing them are displaced relative to one another to follow the turn. On the outside of the curve, the extremities of modules 3 and of intermediate articulation units 6 move apart from one another, as seen in detail in FIG. 7. Conversely, on the inside of the curve, the extremities of modules 3 and of intermediate articulation units 6 move closer together as shown in detail in FIG. 8. On certain vehicles the rigid lateral walls of intermediate articulation units 6 are displaced laterally, during turns relative to the lateral walls of the other modules 3 on the vehicle, by moving apart toward the interior of the turn.

These relative displacements by the various modules 3 and units 6 on vehicle 1 create comparable movements at the level of collection structures 8. All these movements are made possible because of the mechanical discontinuity existing between each successive collection element 13 supported by the various modules 3 and units 6 of the vehicle that remain mechanically independent from one another. However, the localized doubling of conductive tracks 14 on each collection element 13, at their respective end portions 23, allows a continuity of electrical supply to be maintained by using electrical distribution units 16 adapted in size, even on curved portions of the trajectory.

Upper lateral collection structure 8 of the invention, or each of its collection elements 13, also comprises a support 24 to which conductive track 14 is attached and which allows conductive track 14 to be mechanically held. This support 24 is made of electrically insulating material in order to electrically insulate the conductive track 14 from the rest of vehicle 1.

Support 24 may be formed as one piece that is continuous along the entire collection structure 8 or along each of the collection elements 13. It may also be perforated or formed of an assembly of supporting posts or any other electrically insulating structure capable of mechanically supporting conductive track 14.

Preferably upper collection structure 8 also comprises an outer wall 25 to at least partially hide collection structure 8 for aesthetic reasons. It covers collection structure 8 to make it inconspicuous and attractive. Preferably, it may consist of a lateral wall extending longitudinally relative to the vehicle and in the extension of the vehicle's lateral side wall 12, said outer wall 25 preferably being continuous along each collection element 13.

In a preferred embodiment shown in FIG. 2, the extremities of this outer wall may be shaped like ramps, in the same way as the collection structure, so as to integrate and unify sloping portions 22 of conductive track 14 as aesthetically as possible.

This outer wall 25 may also serve as a protective wall by at least partially masking conductive track 14 or making this conductive track 14 less accessible to passengers and pedestrians. Additionally, it may serve as supplemental protection from electrical shocks and serve as a sound barrier.

Outer wall 25 may be independent from support 24 or assembled on it. It may also be formed as one piece with support 24 as in the preferred embodiment illustrated by FIGS. 1 through 9.

Preferably, outer wall 25 is not directly in contact with the vehicle body. A free space 26 may advantageously be left between the two for evacuating rainwater. This space also limits transmission of structure-borne noise, for example, when collection structure 8 is attached to suspension blocks.

Upper lateral collection structure 8 of the invention also comprises a mechanical connection means 27 for joining and assembling upper lateral collection structure 8 or each of its collection elements 13 to vehicle 1. This mechanical connection means may be any type whatsoever.

For example, as in the first variation of the invention shown in FIGS. 1 through 9, it may be one or more connecting arms 28, one extremity 29 of which is affixed to support 24 and the other extremity 30 of which is affixed to or mounted directly or indirectly on the vehicle. In the situation shown, these connecting arms 28 are affixed to a structure that is also insulating so as to offer a supplemental barrier to the circulation of electrical current. Upper lateral collection structure 8 comprises, depending on its length, one or more connecting arms 28 and preferably two connecting arms 28 for each collection element 13 on structure 8, each of these arms 28 being placed at one of the extremities of the collection structure 13 concerned, for example.

In the embodiment shown, these connecting arms 28 are placed on vehicle roof 10 where they extend generally transverse to the vehicle, for example, as far as the central portion of roof 10 to which they are directly or indirectly joined by their end 30, preferably by a pivot articulation such as articulation 31. Extremity 30 of connection arms 28 is mounted on a support 32 affixed to vehicle roof 10, for example.

Preferably these articulations 31 are flexible articulations, for example, rubber, for effectively filtering structural noise originating from shocks during electrical contact between electrical distribution shoe 16 and conductive track 14, or the noise from distribution shoe 16 moving along conductive track 14 during displacement of vehicle 1.

Because of their pivoting articulation 31, connecting arms 28 preferably can be raised, thereby allowing upper lateral collection structure 8 to be lifted so as to be placed well above the roof. In this raised configuration, it is possible for the roof to become totally accessible and the covers of even the largest roof containers can be opened with no difficulty.

Additionally, since collection structure 8 of the invention is lateral, a pantograph 33 can also be freely deployed upwards and placed in position for use if the vehicle is equipped with one.

Obviously other ways exist to make the vehicle's upper collection structure 8 displaceable in order to free up vehicle roof 10, allowing different models of roof containers to be used with covers that open in various ways, as well as the possibility of using pantographs or other roof equipment deployed in various ways.

Upper lateral collection structure 8 may tilt laterally, for example, it may be laterally extendable using telescopic connecting arms, or it may even be possible to raise or lower it vertically. All these variations and even many others are easily imagined and implemented by a person skilled in the art.

Depending on the applications, upper lateral collection structure 8 may also be fixed and non-displaceable.

According to another possible embodiment, collection structure 8 may be supported not by supplemental connecting arms 28, but directly by the cover or lid of the roof containers, which then constitute the mechanical connection means 27.

Upper lateral collection structure 8 may be attached directly to the body of vehicle 1 by its mechanical connection means 27. However, in order to further reinforce the electrical insulation, a supplemental insulating layer, for example, in the form of one or more bands 34 of insulating material (FIG. 5) may be inserted between mechanical connection means 27 of collection structure 8 and the vehicle body.

Upper lateral collection structure 8 of the invention further comprises a suspension and damping device 35 to absorb shocks coming from electrical energy distribution shoe 16 and ensure satisfactory contact between contact zone 15 of conductive track 14 and electrical energy distribution shoe 16.

This suspension and damping device 35 eliminates shocks and friction between upper lateral collection structure 8 and the vehicle structure and it limits noise.

Suspension and damping device 35 preferably comprises one or more flexible blocks 36, for example rubber blocks, preferably inserted between support 24 and mechanical connection means 27 or between mechanical connection means 27 and the body of vehicle 1.

In the embodiment shown in FIG. 5 suspension and damping device 35 is formed of two flexible blocks 36 mounted on insulating band 34, with extremity 29 of connecting arm 28 resting on them.

To avert the accidental and undesirable lifting of connecting arm 28 while the vehicle is in motion, a temporary means for blocking connecting arm 28 is preferably provided to prevent this movement. This temporary blocking means is a locking element 37, for example, for joining extremity 29 of connecting arm 28 to a plate 38 integral with the two flexible blocks 36 on suspension and damping device 35.

When upper lateral collection structure 8 or one of its collection elements 13 is attached to a vehicle wall having its own suspension system, it is not always necessary to add a supplemental suspension device near the collection structure. In this instance the suspension system itself on the corresponding vehicle wall constitutes the suspension and damping device 35 for upper lateral collection structure 8. This is generally the case, for example, when collection elements 13 are attached to the rigid lateral walls of intermediate articulation units 6.

FIGS. 12 through 14 illustrate a second preferred embodiment of the invention which will be succinctly described below and according to which upper lateral collection structure 8, of the invention, is provided to cooperate with an electrical energy distribution shoe 16 that is essentially vertical or slightly angled relative to the vertical.

In this case, and as described previously, conductive track 14 has a contact zone 15 oriented toward the exterior of the vehicle, that is, located facing electrical energy distribution shoe 16.

To prevent a groove from forming in electrical distribution shoe 16 due to wear, conductive track 14 is curved and it follows a serpentine path from top to bottom while remaining essentially longitudinal to the vehicle.

Said conductive track 14 has, at each extremity, a sloping portion 22 forming an inclined ramp engaging electrical energy distribution shoe 16. This sloping portion 22 is angled toward the inside of the vehicle (FIG. 14) and follows the curve of each end of vehicle 1.

Conductive track 14, formed of a metal rod 20 attached to a conductive aluminum piece 21, is held on a support 24 made of insulating material that extends into an exterior lateral wall 25 forming one piece with support 24.

This exterior wall 25 is located below conductive track 14 and hides support 24, suspension and damping device 35 and mechanical connection means 27 on upper lateral collection structure 8. Exterior wall 25 extends longitudinally relative to the vehicle in the extension of its lateral side wall 12, but without being directly in contact with this wall 12.

Upper lateral collection structure 8 is attached to the vehicle body by means of a mechanical connection 27, fixed and attached to lateral edge 9 of roof 10 of vehicle 1. It is also possible to attach mechanical connection 27 to the upper edge 11 of the vehicle's lateral side wall 12.

Two flexible blocks 36, inserted between support 24 and mechanical connection means 27, constitute the suspension and damping device 35 for upper lateral collection structure 8.

It is apparent that the invention is not limited to the preferred embodiments described above and shown in the various drawings, since a person skilled in the art might make numerous modifications and conceive of other variations without departing from either the scope or the context of the invention defined in the claims.

The invention claimed is:

1. An upper collection structure (8) for attachment to a land vehicle (1) comprising at least one module (3), the upper collection structure (8) cooperating with a plurality of fixed distribution supports (17) for supplying either main-drive or auxiliary electrical energy to the vehicle (1) to facilitate road travel of the vehicle (1), and each of the plurality of fixed distribution supports (17) comprising an electrical energy distribution shoe (16) disposed along a travel route of the vehicle, the upper collection structure comprising:

at least one collection structure (13), each collection structure (13) comprising at least one conductive track (14) disassociated from the vehicle structure, and the at least one conductive track (14) extends substantially longitudinally relative to a longitudinal direction of the vehicle (1);

the at least one conductive track (14), on each portion of the vehicle (1), extending along an upper lateral portion of the vehicle (1), and the at least one conductive track (14) comprising either a sliding or a motionless contact zone

(15) for engagement with the electrical energy distribution shoe (16) or a contact zone with either a flat or a convex upper contact surface;

the conductive track (14) being joined to an electrical supply circuit of the vehicle (1) by a flexible electrical connection;

the conductive track (14) being attached to an electrically insulating support (24);

a mechanical connection (27) for connecting the collection structure (27) to the vehicle and allowing the collection structure to be displaced in order to free up a roof (10) of the vehicle (1);

a suspension and damping device (35), supported by the vehicle, for absorbing shocks generated from the electrical energy distribution shoe (16) and ensuring contact between the contact zone (15) of the conductive track (14) and the electrical energy distribution shoe (16); and an outer wall (25) at least partially covering the upper collection structure (8).

2. The upper collection structure according to claim 1, wherein the upper collection structure is attached to either a lateral edge (9) of the roof (10) of the vehicle (1) or to an upper edge (11) of a lateral side wall (12) of the vehicle (1).

3. The upper collection structure according to claim 1, wherein the conductive track (14) is either linear and generally rectilinear or slightly oblique.

4. The upper collection structure according to claim 1, wherein the conductive track (14) comprises transverse deviations which are either curved, undulating, zigzag, twisting or snaking alternately toward an inside and then an outside of the vehicle, or snaking alternately from top to bottom.

5. The upper collection structure according to claim 1, wherein the contact zone (15) on the conductive track (14) is directed either upward or toward the exterior of the vehicle (1).

6. The upper collection structure according to claim 1, wherein the conductive track (14) is formed from either a bar, a rod or a metal wire (20) attached to an electrically conductive portion (21).

7. The upper collection structure according to claim 1, wherein the conductive track (14), of the at least one of the collection structure (13), has at least at one end (23) with a sloping portion (22) which is formed as an angled engaging ramp for the electrical energy distribution shoe (16).

8. The upper collection structure according to claim 7, wherein the sloping portion (22) is either;
angled vertically downward or toward an inside of the vehicle (1), or the sloping portion (22) follows a curvature of an extremity of the vehicle (1) toward a front of the vehicle in a direction of travel.

9. The upper collection structure according to claim 7, wherein the at least one of the collection structure (13) comprises a plurality of collection structures (13), and each of the plurality of collection structures (13) comprises a sloping portion (22) at each of opposed extremities (23) thereof.

10. The upper collection structure according to claim 1, wherein the at least one of the collection structure (13) comprises two successive collection structures (13), and the conductive tracks (14), on the two successive collection structures (13), extend side by side at their adjacent end portions (23) so as to locally double the conductive track (14) adjacent the end portions.

11. The upper collection structure according to claim 1, wherein the electrical connection comprises at least one diode through which the conductive track (14) is connected to an electrical circuit of the vehicle, and the diode allows passage of electricity from the conductive track (14) toward the electrical circuit of the vehicle.

12. The upper collection structure according to claim 1, wherein the mechanical connection (27) comprises either a cover or a lid of containers on the roof of the vehicle (1).

13. The upper collection structure according to claim 1, wherein the suspension and damping device (35) comprises either;
at least one flexible block (36), or
a suspension system itself for a vehicle wall to which the collection structure (8) is attached.

14. The upper collection structure according to claim 1, wherein the outer wall (25) is either assembled on the electrically insulating support (24) or the suspension and damping device (35) forms as part of the electrically insulating support (24).

15. The upper collection structure according to claim 1, wherein the outer wall (25) is a lateral wall which extends longitudinally relative to the vehicle and forms an extension of one lateral side wall (12) of the vehicle, but without directly contacting the lateral side wall (12).

16. An upper collection structure (8) for attachment to a land vehicle (1) comprising at least one module (3), the upper collection structure (8) cooperating with a plurality of fixed distribution supports (17) for supplying either main-drive or auxiliary electrical energy to the vehicle (1) to facilitate road travel of the vehicle (1), and each of the plurality of fixed distribution supports (17) comprising an electrical energy distribution shoe (16) disposed along a travel route of the vehicle, the upper collection structure comprising:

at least one collection structure (13), each collection structure (13) comprising at least one conductive track (14) disassociated from the vehicle structure, and the at least one conductive track (14) extends substantially longitudinally relative to a longitudinal direction of the vehicle (1);

the at least one conductive track (14), on each portion of the vehicle (1), extending along an upper lateral portion of the vehicle (1), and the at least one conductive track (14) comprising either a sliding or a motionless contact zone (15) for engagement with the electrical energy distribution shoe (16) or a contact zone with either a flat or a convex upper contact surface;

the conductive track (14) being joined to an electrical supply circuit of the vehicle (1) by a flexible electrical connection;

the conductive track (14) being attached to an electrically insulating support (24);

a mechanical connection (27) for connecting the collection structure (27) to the vehicle and allowing the collection structure to be displaced in order to free up a roof (10) of the vehicle (1); and a suspension and damping device (35), supported by the vehicle, for absorbing shocks generated from the electrical energy distribution shoe (16) and ensuring contact between the contact zone (15) of the conductive track (14) and the electrical energy distribution shoe (16);

the mechanical connection (27) comprises at least one connection arm (28), one extremity (29) of which is attached to the electrically insulating support (24) and an other extremity (30) of which is either affixed or directly or indirectly attached to the vehicle (1).

17. The upper collection structure according to claim 16, wherein the connecting arm (28) extends generally transverse to the roof (10) of the vehicle, and the connecting arm (28) is either directly or indirectly connected to the roof (10) by its other extremity (30).

18. The upper collection structure according to claim 17, wherein the connecting arm (28) extends to a central portion of the roof (10) of the vehicle where the connecting arm (28) is either directly or indirectly connected to the roof (10) by its other extremity (30).

19. The upper collection structure according to claim 17, wherein the other extremity (30) of the connecting arm (28) is either directly or indirectly connected to the roof (10) of the vehicle by a pivoting articulation (31).

20. An upper collection structure (8) for attachment to a land vehicle (1) comprising at least one module (3), the upper collection structure (8) cooperating with a plurality of fixed distribution supports (17) for supplying either main-drive or auxiliary electrical energy to the vehicle (1) to facilitate road travel of the vehicle (1), and each of the plurality of fixed distribution supports (17) comprising an electrical energy distribution shoe (16) disposed along a travel route of the vehicle, the upper collection structure comprising:

at least one collection structure (13), each collection structure (13) comprising at least one conductive track (14) disassociated from the vehicle structure, and the at least one conductive track (14) extends substantially longitudinally relative to a longitudinal direction of the vehicle (1);

the at least one conductive track (14), on each portion of the vehicle (1), extending along an upper lateral portion of the vehicle (1), and the at least one conductive track (14) comprising either a sliding or a motionless contact zone (15) for engagement with the electrical energy distribution shoe (16) or a contact zone with either a flat or a convex upper contact surface;

the conductive track (14) being joined to an electrical supply circuit of the vehicle (1) by a flexible electrical connection;

the conductive track (14) being attached to an electrically insulating support (24);

a mechanical connection (27) for connecting the collection structure (27) to the vehicle and allowing the collection structure to be displaced in order to free up a roof (10) of the vehicle (1);

a suspension and damping device (35), supported by the vehicle, for absorbing shocks generated from the electrical energy distribution shoe (16) and ensuring contact between the contact zone (15) of the conductive track (14) and the electrical energy distribution shoe (16);

the suspension and damping device (35) comprises either at least one flexible block (36) or a suspension system itself for a vehicle wall to which the collection structure (8) is attached; and the at least one flexible block (36) is inserted either between the electrically insulating support (24) and the mechanical connection (27) or between the mechanical connection (27) and a body of the vehicle (1).

* * * * *